United States Patent [19]

Yamashita et al.

[11] Patent Number: 5,367,545
[45] Date of Patent: Nov. 22, 1994

[54] ASYNCHRONOUS SIGNAL EXTRACTING CIRCUIT

[75] Inventors: Haruo Yamashita, Yokohama; Yuji Takizawa, Kawasaki, both of Japan

[73] Assignee: Fujitsu Limited, Kawasaki, Japan

[21] Appl. No.: 838,230

[22] PCT Filed: Jul. 4, 1991

[86] PCT No.: PCT/JP91/00900

§ 371 Date: Mar. 4, 1992

§ 102(e) Date: Mar. 4, 1992

[87] PCT Pub. No.: WO92/01342

PCT Pub. Date: Jan. 23, 1992

[30] Foreign Application Priority Data

Jul. 4, 1990 [JP] Japan .................. 2-175168

[51] Int. Cl.$^5$ .............................. H04L 7/027
[52] U.S. Cl. ..................... 375/118; 375/120
[58] Field of Search ............. 375/118, 112, 120, 119; 370/102; 359/158, 159; 369/60; 365/78

[56] References Cited

U.S. PATENT DOCUMENTS

| 4,095,053 | 6/1978 | Duttweiler et al. | 370/102 |
| 4,667,324 | 5/1987 | Graves | 375/112 |
| 5,245,636 | 9/1993 | Sari et al. | 370/102 |

FOREIGN PATENT DOCUMENTS 1-270428 10/1989 Japan .
2-035836 2/1990 Japan .

OTHER PUBLICATIONS

Holborow et al., "Synchronization of Transmission Systems," IEEE International Conference on Communications '88, vol. 2, Jun. 12, 1988, pp. 895–898.

Sabit Say, "Bellcore: Contribution To T1 Standards Project," A Synchronous Desynchronizer, Jul. 25, 1988, pp. 1–7.

*Primary Examiner*—Tesfaldet Bocure

[57] ABSTRACT

An asynchronous signal extracting circuit for extracting asynchronous signals multiplexed in a synchronization frame, including a demultiplexer unit that demultiplexes asynchronous signals and clock signals which are in synchronism with valid data in the asynchronous signals, a buffer memory that writes valid data in the demultiplexed asynchronous signals using the clock signals as write clock signals, a phase-locked loop circuit that forms read clock signals for the memory, and a control unit that switches the frequency band of a low-pass filter in the circuit periodically or in response to a detection signal of pointer adjustment. The circuit suppresses low-frequency jitter contained in the read clock signals.

6 Claims, 15 Drawing Sheets

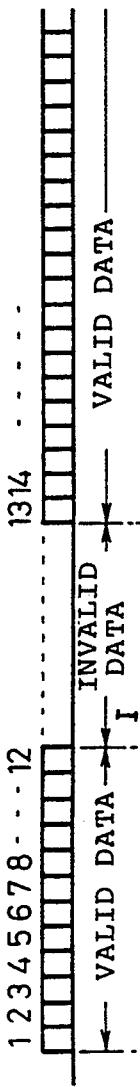
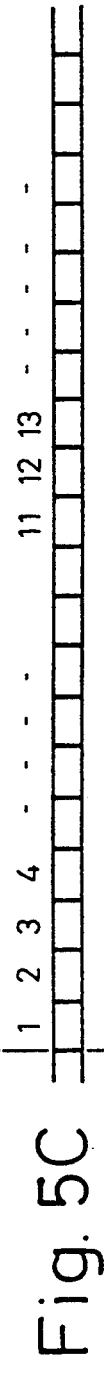
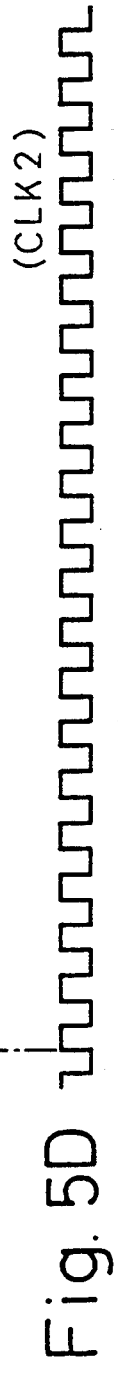
Fig. 5A
Fig. 5B
Fig. 5C
Fig. 5D
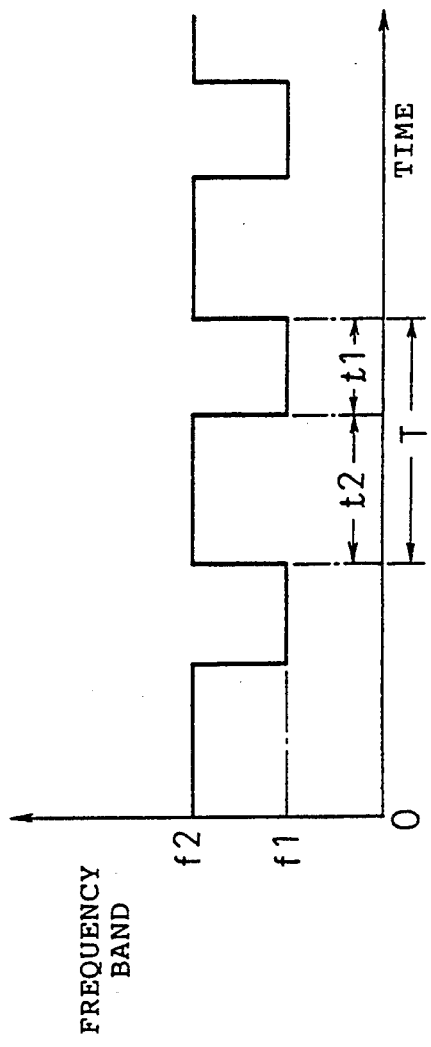
Fig. 6

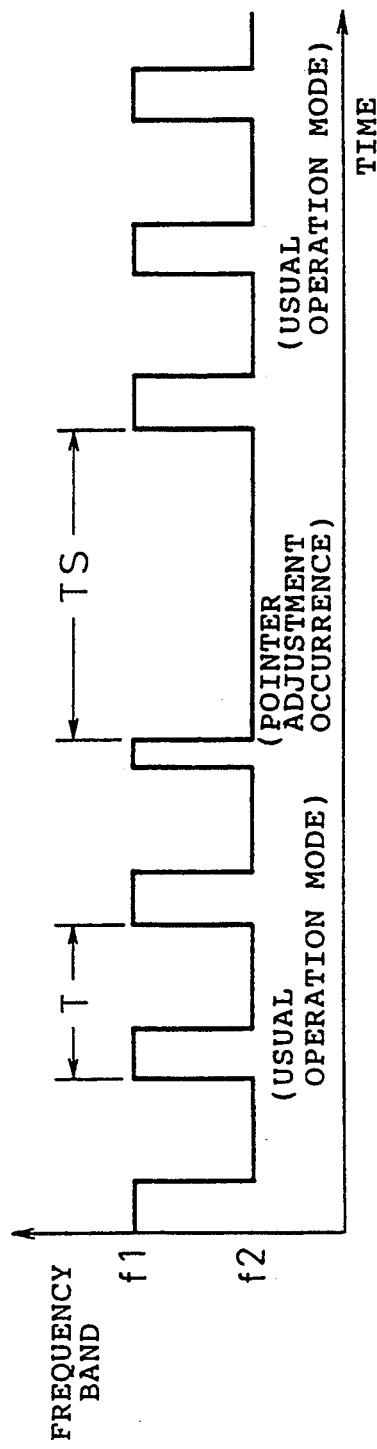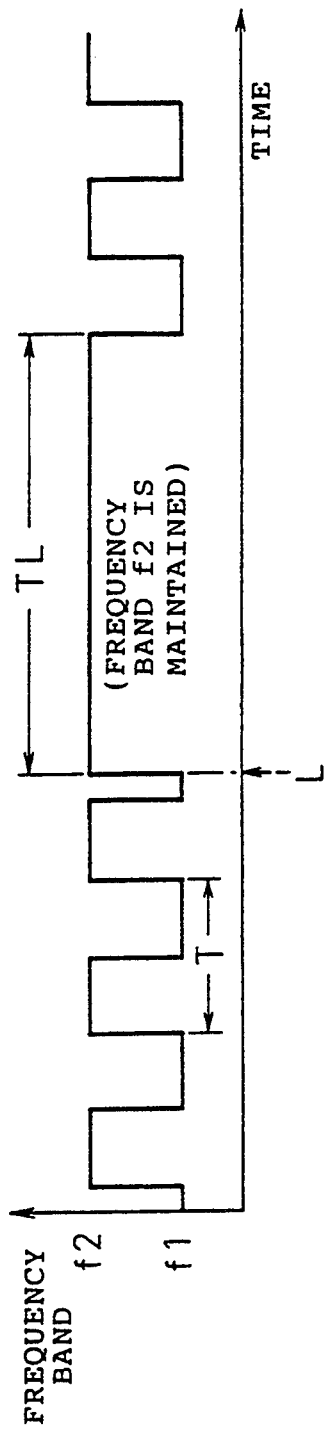

ASYNCHRONOUS SIGNAL EXTRACTING CIRCUIT

TECHNICAL FIELD

The present invention provides an asynchronous signal extracting circuit for extracting asynchronous signals that are multiplexed in a synchronization frame.

BACKGROUND ART

A synchronous digital hierarchy (SDH) for transmitting asynchronous signals in a multiplexed form in a synchronization frame has been standardized as recommended by CCITT (International Telegraph and Telephone Consultative Committee) and T1 Committee of U.S.A. In the synchronous digital hierarchy, it is necessary to extract asynchronous signals from the received signals in order to obtain valid data accompanying almost no jitter.

In the synchronous digital hierarchy (SDH) recommended by CCITT, a difference in speed between the synchronous system and the asynchronous system is corrected by a pointer adjustment function; i.e., invalid data consisting of eight bits is inserted or deleted by the pointer adjustment, and a phase jump of eight bits takes place in the formation payload. The phase jump causes jitter that is given to asynchronous signals extracted from the synchronous multiplexed signals that are received. On the receiving side, therefore, the jitter must be suppressed by using phase-locked loop circuit or a like circuit.

On the receiving side in the conventional synchronous digital hierarchy as will be described later in detail, valid data only are written using a buffer memory when the asynchronous signals are to be extracted by receiving synchronous multiplex signals, and the valid data are read out according to read clock signals. Here, the write clock signals of a buffer memory have an untoothed period that varies depending upon the presence or absence of pointer adjustment, and the moment at which the pointer adjustment takes place is not definite, resulting in the occurrence of low-frequency jitter as described above.

As a means for reducing the low-frequency jitter, for example, the Contribution (T1X1.6/89-020R2) of T1X1.6 of U.S.A. discloses circuits and problems. The circuits are:

(1) A desynchronizer (asynchronous signal extracting circuit) equipped with a PLL of a very low frequency band;

(2) A synchronous desynchronizer;

(3) A fixed bit leak circuit (using PLLs in two stages); and (4) A two-stage PLL of the linear digital control type.

The circuit (1) requires a PLL of a frequency band as narrow as about 3 Hz with which it is difficult to realize a practical circuit.

The circuit (2) requires digital control that adapts to the monitoring of a buffer memory, which results in a complex circuit apparatus and control operation.

In the circuit (3), the bits slowly leak over a given period of time as the pointer adjustment takes place, and the jitter component decreases. Here, however, the buffer memory must have an extra capacity to cope with the pointer adjustment that takes place continuously.

The circuit (4) requires a digital filter or a dither, causing the circuit apparatus to become complex.

SUMMARY OF THE INVENTION

In view of the above-mentioned defects, the object of the present invention is to suppress the low-frequency jitter relying upon a simple apparatus.

In order to achieve the above object according to the present invention, a control is applied to the frequency band of a low-pass filter mounted in a phase-locked loop circuit that forms the read clock signals that will be applied to the buffer memory. The low-frequency jitter is suppressed by controlling the frequency band.

BRIEF DESCRIPTION OF DRAWINGS

The invention will now be described with reference to the accompanying drawings wherein:

FIGS. 5A to 5D are diagrams of signals for explaining the write clock signals and the read clock signals;

FIG. 6 is a diagram for explaining the operation based upon a first example of the present invention;

FIG. 14 is a diagram for explaining the operation based upon a ninth example of the present invention;

FIG. 15 is a diagram for explaining the operation based upon a tenth example of the present invention;

BEST MODE FOR CARRYING OUT THE INVENTION

Prior to describing the present invention, the apparatus of the receiving side in the aforementioned conventional synchronous digital hierarchy will be described with reference to the drawings.

Figure 1:
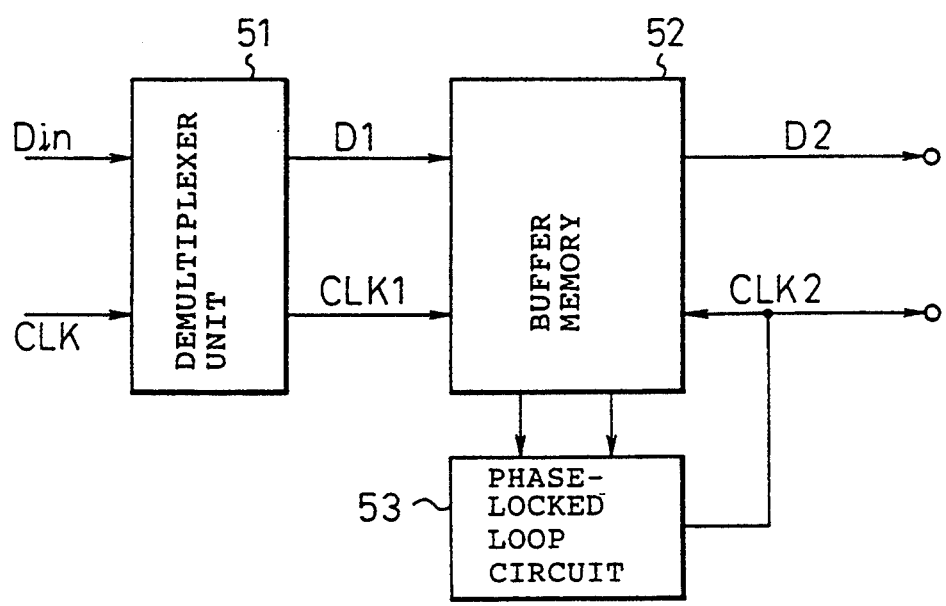
FIG. 1 is a block diagram showing major portions of the receiving side in a conventional synchronous digital hierarchy.

FIG. 1 is a block diagram of major portions of the receiving side in the conventional synchronous digital hierarchy, and FIGS. 2A to 2H are diagrams of signals for explaining the operation of the conventional system. Synchronous multiplexed signals Din and input clock signals CLK in synchronism therewith are applied to a demultiplexer unit 51 from a receiving unit that is not shown. The demultiplexer unit 51 detects the presence of pointer adjustment and gives write clock signals CLK 1 that indicate valid data to a buffer memory 52. The write clock signals CLK 1 form a pulse train that is untoothed in the portions of invalid data. The input data D1 are written into the buffer memory 52 in accordance with the write clock signals CLK 1.

The data D2 are read out from the buffer memory 52 by continuous read clock signals CLK 2, which are brought into synchronism in phase with the write clock signals CLK 1 by a phase-locked loop circuit (hereinafter referred to as PLL) 53 which comprises a phase comparator that compares the phase of write clock signals CLK 1 with the phase of read clock signals CLK 2, a low-pass filter which removes high-frequency components from a resultant phase comparison output signal, and a voltage controlled oscillator, which is controlled by the output signal of the low-pass filter and outputs the read clock signals CLK 2 directly or by dividing its frequency.

Figure 2A:
FIGS. 2A to 2H are diagrams of signals for explaining the operation of the conventional example of FIG. 1.
Figure 2B:
Figure 2C:
Figure 2D:
Figure 2E:
Figure 2F:

When the input data D1 and the write clock signals CLK 1 are as shown in FIGS. 2A and 2B, where there is no pointer adjustment and when the invalid data are deleted by the pointer adjustment, i.e., a minus pointer adjustment takes place, they become as shown in FIGS. 2C and 2D. In the case when the invalid data are inserted by the pointer adjustment, i.e., in the case of a plus pointer adjustment, the data become as shown in FIGS. 2E and 2F and the phase jump of eight bits takes place as described above.

Figure 2G:
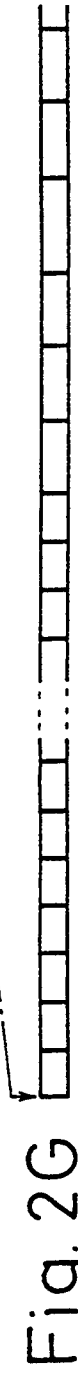
Figure 2H:
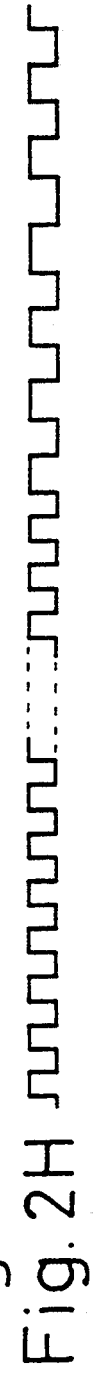

As shown in FIGS. 2G and 2H in an exaggerated manner, the read data D2 and the read clock signals CLK 2 from the buffer memory 52 have different periods in the rising timing due to the phase jump. Therefore, the pointer adjustment is in many cases carried out maintaining a relatively long random period, and hence low-frequency jitter is contained in the read clock signals CLK 2.

The above-mentioned four circuit apparatuses (1), (2), (3) and (4) have been known as a means for decreasing the low-frequency jitter involving, however, their inherent defects as mentioned above. The asynchronous signal extracting circuit of the present invention, which is free from the above-mentioned defects, will now be described in detail.

Figure 3:
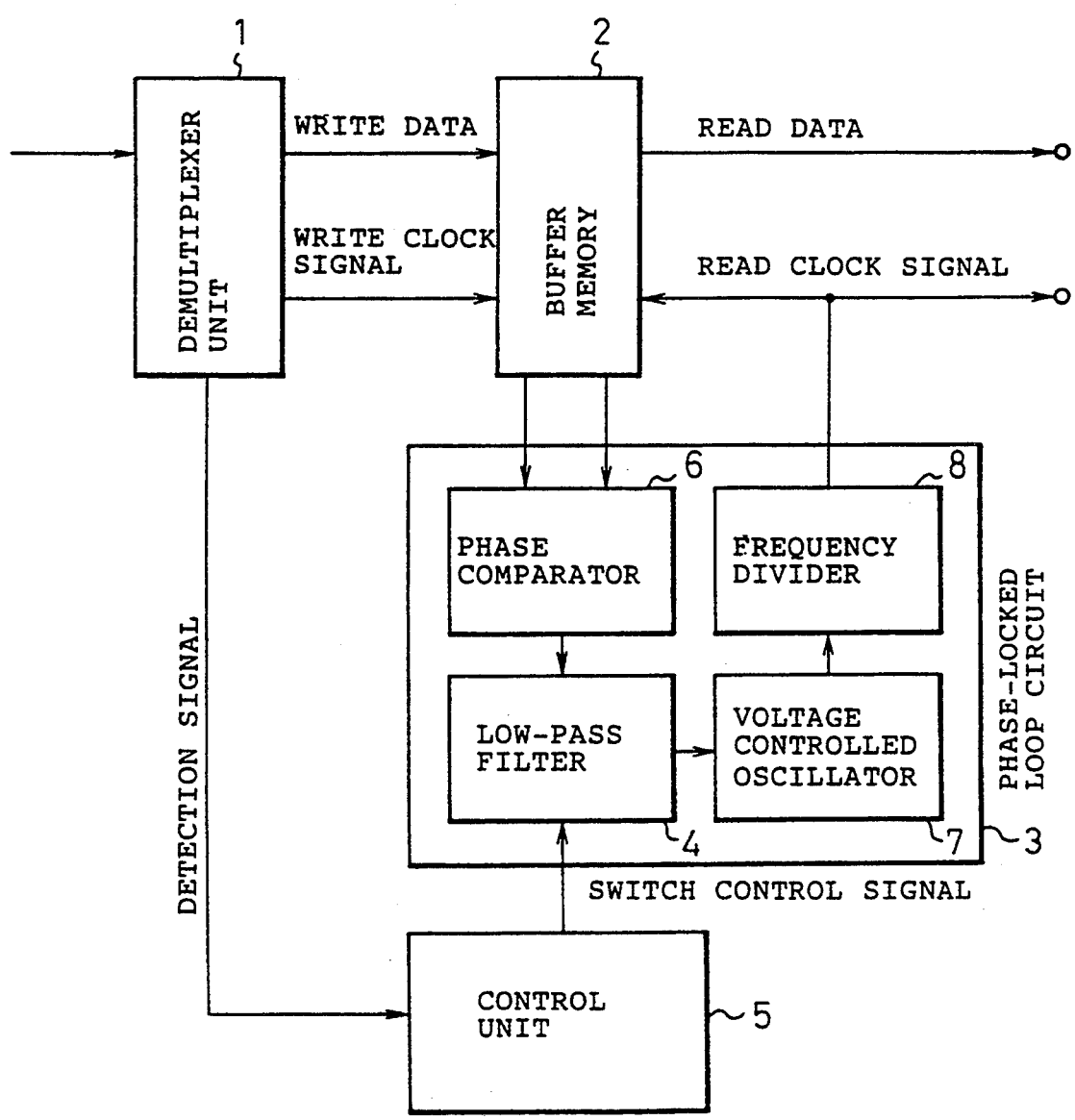
FIG. 3 is a block diagram showing the principle and apparatus of an asynchronous signal extracting circuit according to the present invention.

FIG. 3 is a block diagram illustrating the principle and apparatus of the asynchronous signal extracting circuit according to the present invention.

The circuit comprises:

a demultiplexer unit 1 which demultiplexes asynchronous signals multiplexed in a synchronization frame and clock signals in synchronism with valid data in the asynchronous signals;

a buffer memory 2 that writes valid data in the asynchronous signals demultiplexed by the demultiplexer unit 1 using the clock signals from the demultiplexer unit 1 as write clock signals;

a phase-locked loop circuit 3 that forms read clock signals for the buffer memory 2; and a control unit 5 that switches the frequency band of a low-pass filter 4 in the phase-locked loop circuit 3 periodically or in response to a detection signal of pointer adjustment in the demultiplexer unit 1. Here, the phase-locked loop circuit 3 comprises a phase comparator 6 that compares the phase of write clock signal with the phase of read clock signal, the aforesaid low-pass filter 4, a voltage controlled oscillator 7 and a frequency divider 8.

The control unit 5 may be comprised so as to continuously, or in steps, switch the frequency band of the low-pass filter 4 in a predetermined period.

The control unit 5 further may be comprised so as to successively narrow the frequency band of the low-pass filter 4 every time a detection signal of pointer adjustment in the asynchronous signals is obtained in the demultiplexer unit 1 within a predetermined period of time and return the frequency band of the low-pass filter 4 to the initial frequency band gradually or at a time when the detection signal of invalid data is not obtained within a predetermined period of time.

The embodiment of the present invention can be modified in a variety of ways. The phase-locked loop circuit 3 may be comprised by a counter that counts the phase difference between the write clock signal of buffer memory 2 and read clock signal, and a frequency divider of which the frequency-dividing ratio is controlled when the counted content of the counter has reached a setpoint value and produces a frequency-divided output signal as a read clock signal.

The control unit 5 may be comprised so as to switch the frequency band of the low-pass filter by changing the setpoint value of counted content of the counter.

It is further possible to constitute the buffer memory 2 and the phase-locked loop circuit 3 in two stages, wherein the read clock signal from the phase-locked loop circuit of the first stage to the buffer memory of the first stage is used as a write clock signal for the buffer memory of the second stage, and the read clock signal for the buffer memory of the second stage is formed by the phase-locked loop circuit of the second stage, and wherein a control unit can be provided to control the frequency band of the low-pass filter in the phase-locked loop circuit of either the first stage or the second stage.

It is possible to provide a control unit that controls the frequency bands of low-pass filters in the phase-locked loop circuits of the first stage and the second stage in a complementary manner, i.e., in a manner that the frequency band of the low-pass filter of one phase-locked loop circuit is narrowed when the frequency band of the low-pass filter of the other phase-locked loop circuit is broadened.

Next, the operation of the above-mentioned principle and apparatus will be described.

Valid data only are written into the buffer memory 2 by the write clock signals at which the invalid data portions are untoothed, and are read out by the read clock signals. The read data and read clock signals are transferred to a processing circuit or the like circuit in the next stage, which is not illustrated.

The low-frequency jitter can be suppressed by narrowing the frequency band of the low-pass filter 4 in the phase-locked loop circuit 3 resulting, however, in an increase in the time required for pulling in the phase synchronization. Therefore, the frequency band of the low-pass filter 4 is periodically switched to a usual frequency band (e.g., 100 Hz) and a narrow frequency band (e.g., 3 Hz) in response to a switch control signal from the control unit 5 in order to equivalently narrow the frequency band of the low-pass filter 4 and suppress the low-frequency jitter without lengthening the time for pulling in the phase synchronization.

It is further possible to narrow the frequency band of the low-pass filter 4 at a moment when the pointer adjustment takes place thereby to suppress the low-frequency jitter due to the pointer adjustment without lengthening the time for pulling in the phase synchronization.

It is further possible to switch the frequency band of the low-pass filter 4 not only to broad band and narrow band but also to a plurality of frequency bands continuously, or in steps, in order to gradually change the phase in the read clock signals and stabilize the operation of the phase-locked loop circuit 3.

When the detection signals of pointer adjustment are repetitively obtained within a predetermined period of time, i.e., it means that the low-frequency jitter is contained in large amounts. Therefore, the frequency band of the low-pass filter 4 is controlled each time to gradually become narrow. This makes it possible to suppress the low-frequency jitter from increasing. Here, the minimum frequency band may have been determined in advance so that the frequency band will not become narrower than this band. When the detection signal of pointer adjustment is not obtained within predetermined period of time, the frequency band of the low-pass filter 4 is returned to the usual frequency band gradually or at one time.

Moreover, the phase-locked loop circuit 3 may be comprised in a digitally controlled type wherein a phase difference between the write clock signal and the read clock signal of the buffer memory 2 is counted up or is counted down by a counter; the frequency-dividing ratio of the frequency divider is controlled to become great or small when the counted content of the counter has reached a count-up setpoint value or a count-down setpoint value; the frequency-divided output signal of the frequency divider is used as a read clock signal for the buffer memory 2, and the setpoint value of counted content of the counter is changed by the control unit so that the counter acts like the low-pass filter. Therefore, the frequency band of the low-pass filter can be switched in a digital manner. The frequency band can be switched periodically or depending upon a detection signal of pointer adjustment.

When the buffer memory 2 and the phase-locked loop circuit 3 are each constituted in two stages and when the frequency band of the low-pass filter in either one of the phase-locked loop circuits at least is periodically switched by the control unit, the modulation frequency may appear as a jitter component that can be easily removed by selecting a modulation frequency component outside the frequency band of the phase-locked loop circuit of the second stage.

It is further possible to suppress low-frequency jitter without increasing the time for pulling in the phase synchronization by controlling the frequency bands of low-pass filters in the phase-locked loop circuits of the first and second stages in a complementary manner, i.e., one frequency band is narrowed when the other one is broadened.

Embodiments of the present invention will now be described in detail with reference to the accompanying drawings.

Figure 4:
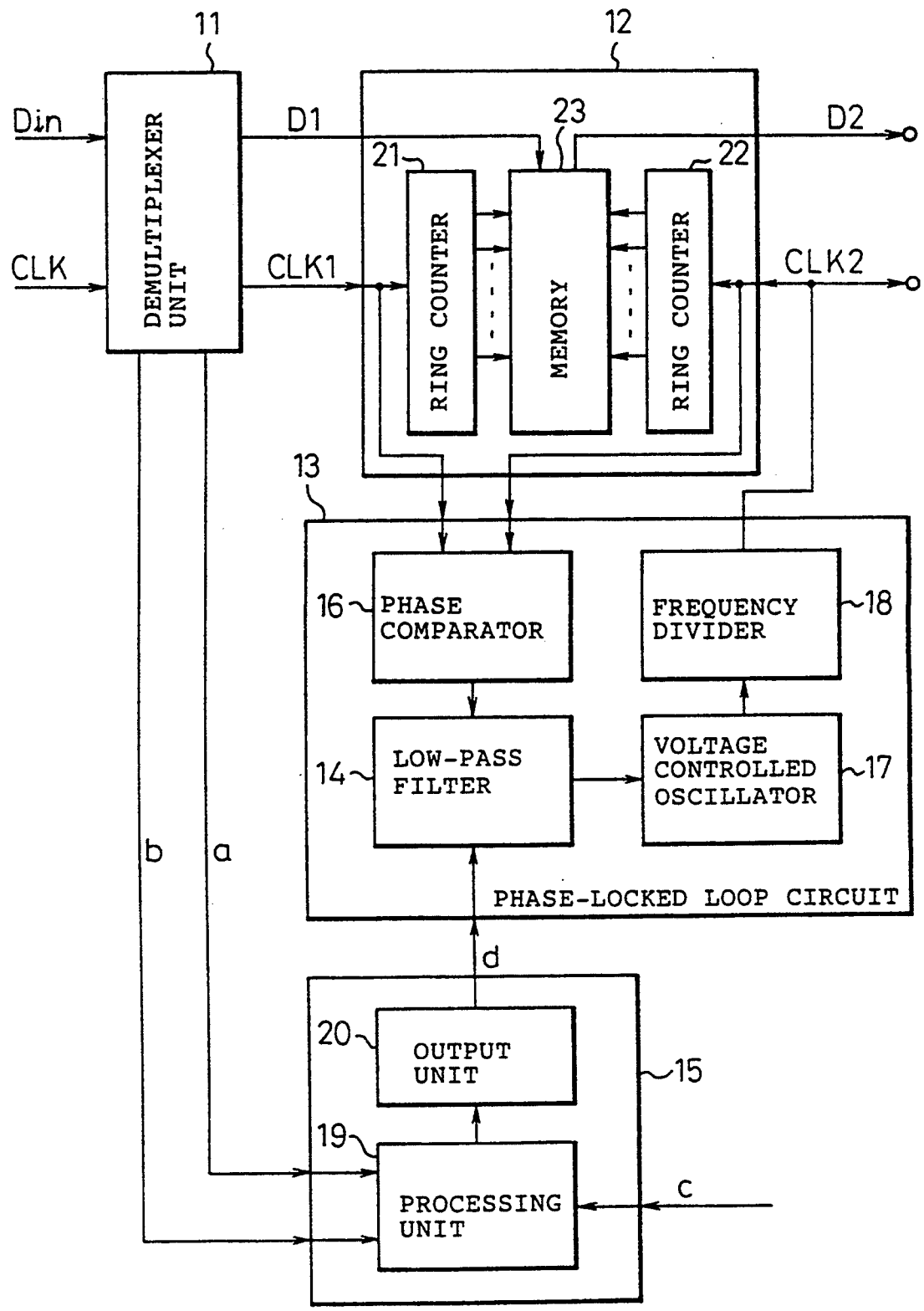
FIG. 4 is a block diagram showing the asynchronous signal extracting circuit according to an embodiment of the present invention.

FIG. 4 is a block diagram illustrating the asynchronous signal extracting circuit according to an embodiment of the present invention, wherein reference numeral 11 denotes a demultiplexer unit, 12 denotes a buffer memory, 13 denotes a phase-locked loop circuit, 14 denotes a low-pass filter, 15 denotes a control unit, 16 denotes a phase comparator, 17 denotes a voltage controlled oscillator, 18 denotes a frequency divider, 19 denotes a processing unit, 20 denotes an output unit, 21 and 22 denote ring counters, and reference numeral 23 denotes a memory.

Synchronous multiplexed signals Din and input clock signals CLK are applied to the demultiplexer unit 11 which are given from a receiving unit, not shown; input data D1 of asynchronous signals demultiplexed from the synchronous multiplexed signals Din and write clock signals CLK 1 representing valid data are applied to the buffer memory 12, and a detection signal "a" of invalid data by the pointer adjustment and a synchronization frame detection signal "b" are applied to the control unit 15.

FIGS. 5A and 5D are signal diagrams explaining the write clock signals and the read clock signals. The valid data and write clock signals CLK 1 of the above case become, as shown in, for example, FIGS. 5A and 5B. That is, the write clock signals CLK 1 form an untoothed pulse train corresponding to invalid data.

The buffer memory 12 in this embodiment comprises a ring counter 21 that operates in response to the write clock signals CLK 1, a ring counter 22 that operates in response to the read clock signals CLK 2, and a memory 23 that writes the input data D1 onto an address specified by the ring counter 21 and reads the data D2 from an address specified by the ring counter 22. The buffer memory 12, however, may be comprised in other ways.

The write clock signals CLK 1 and the read clock signals CLK 2 applied to the buffer memory 12 are further applied to the phase comparator 16 in the phase-locked loop circuit 13 and are compared with regard to their phases. The phase comparison output signal passes through the low-pass filter 14 and serves as a control voltage for the voltage controlled oscillator 17, which controls the oscillation frequency. Output signals of the voltage controlled oscillator 17 are divided by the frequency divider to form read clock signals CLK 2. The read clock signals CLK 2 become, as shown in, for example, FIG. 5D and the read data D2 become as shown in, for example, FIG. 5C, and whereby the valid data written into the buffer memory 12 are read out and are transferred to a processing circuit in the next stage together with the read clock signals CLK 2.

The control unit 15 comprises the processing unit 19 and the output unit 20 that applies switch control signal "d" to the low-pass filter 14. Detection signals "a and b" from the demultiplexer unit 11, and a line condition change signal "c" from a line changing unit not shown, are applied to the processing unit 19 that comprises a microprocessor or the like and executes the processing continuously or in steps to switch the frequency band of the low-pass filter 14 in the phase-locked loop circuit 13 either periodically or in response to the detection signals "a and b" or the line condition change signal "c".

FIG. 6 is a diagram explaining the operation based on a first example of the present invention wherein the frequency band of the low-pass filter 14 is switched to two steps of f1 and f2 at a predetermined period T determined by a timer or the like of the processing unit 19. That is, FIG. 6 shows the case where the usual frequency band f2 is, for example, 100 Hz, a narrow frequency band f1 is, for example 3 Hz, and t1+t2=T where t1 is the time of the frequency band f1 and t2 is the time of the frequency band f2. Therefore, the low-pass filter 14 equivalently acts as a frequency band narrower than the usual frequency band f2 and suppresses the low-frequency jitter without sacrificing the time for pulling in the phase synchronization.

Figure 7A:
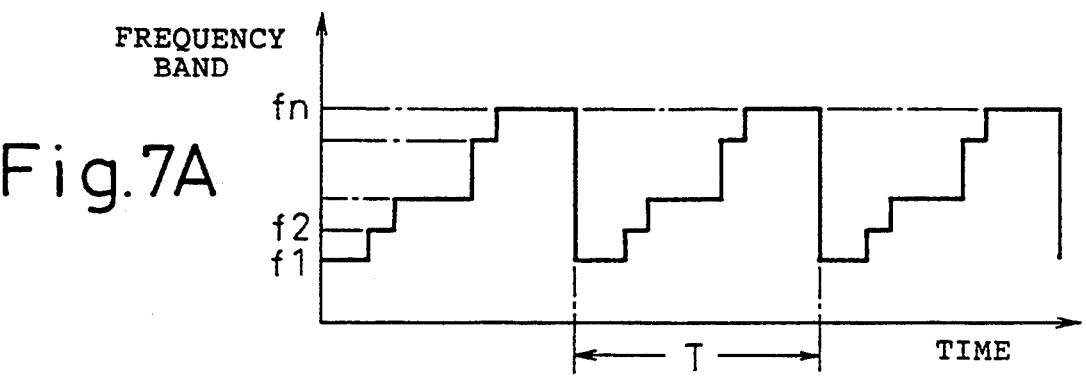
FIGS. 7A to 7C are diagrams for explaining the operation based upon a second example of the present invention.
Figure 7B:
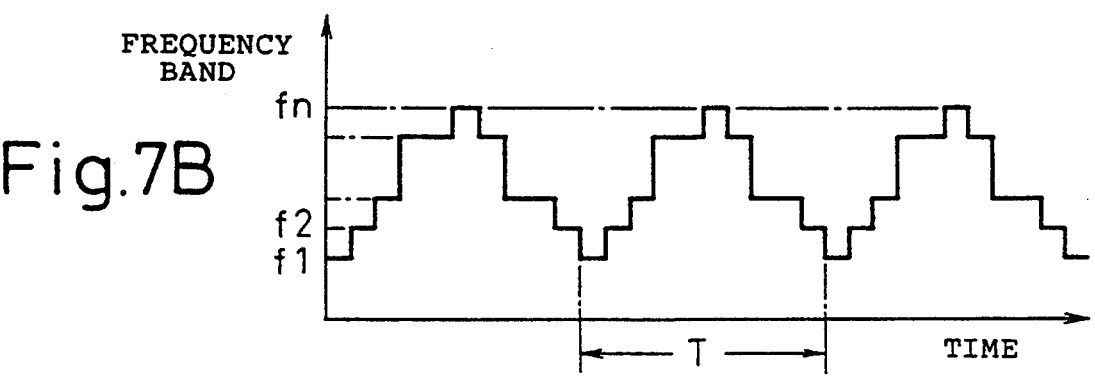
Figure 7C:
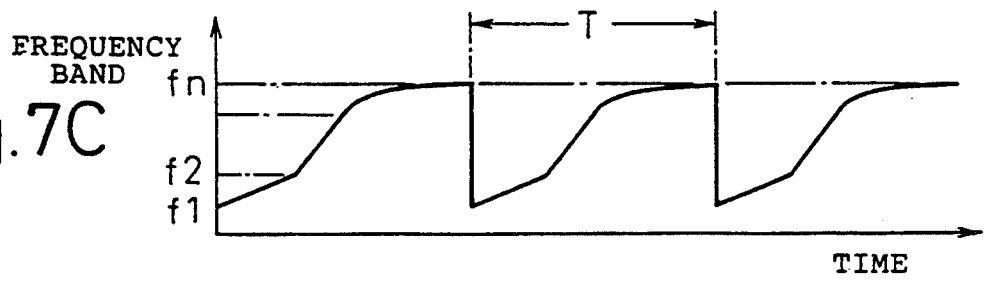

FIG. 7A to 7C are diagrams for explaining the operation based on a second example of the present invention where the frequency band of the low-frequency filter 14 in the phase-locked loop circuit 13 is switched continuously or in steps and wherein FIG. 7A illustrates the case where the frequency band of the low-frequency filter 14 is broadened in steps as indicated by f1, f2, - - - , fn, and returned to the narrowest frequency band f1 after the frequency band fn maintaining a period T. FIG. 7B illustrates the case where the frequency band of the low-pass filter 14 is broadened in steps as indicated by f1, f2, - - - , fn and is then narrowed in steps toward the narrowest frequency band f1 after the frequency band fn maintain a period T. FIG. 7C illustrates the case where the frequency band of the low-pass filter 14 is controlled like a folded line as indicated by f1, f2, - - - , fn, and is returned to the narrowest frequency band f1 after the frequency band fn maintain a period T. Here, the frequency band that is controlled like a folded line may further be linearly or curvedly controlled.

There may be provided a function for generating a frequency band switching control curve of any one of the above-mentioned FIGS. 7A to 7C or other frequency band switching control curves. The function may be exhibited by the processing unit 19 or a function generating circuit may be added to realize the above frequency band switching control.

Figure 8:
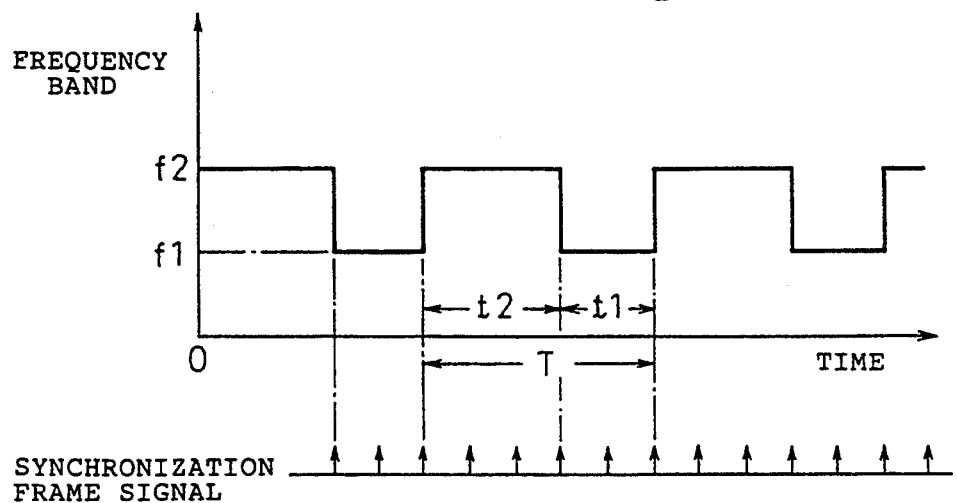
FIG. 8 is a diagram for explaining the operation based upon a third example of the present invention.

FIG. 8 is a diagram for explaining the operation based on a third example of the present invention in the case when the frequency band of the low-pass filter 14 in the phase-locked loop circuit 13 is switched in synchronism with a synchronization frame signal of synchronous multiplexed signals. A detection signal "b" of a synchronization frame signal is applied to the control unit 15 from the demultiplexer unit 11 as in the first example (FIG. 6). Therefore, the processing unit 19 executes the operation based on the detection signal "b" in a manner of t1:t2=3:2 where the period T is the sum of the time t2 of the frequency band f2 and the time t1 of the frequency band f1. Here, the ratio of time t1 to time t2 may be varied. It is further possible to continuously or in steps control the frequency band of the low-pass filter 14 as in the second example (FIGS. 7A to 7C).

Figure 9:
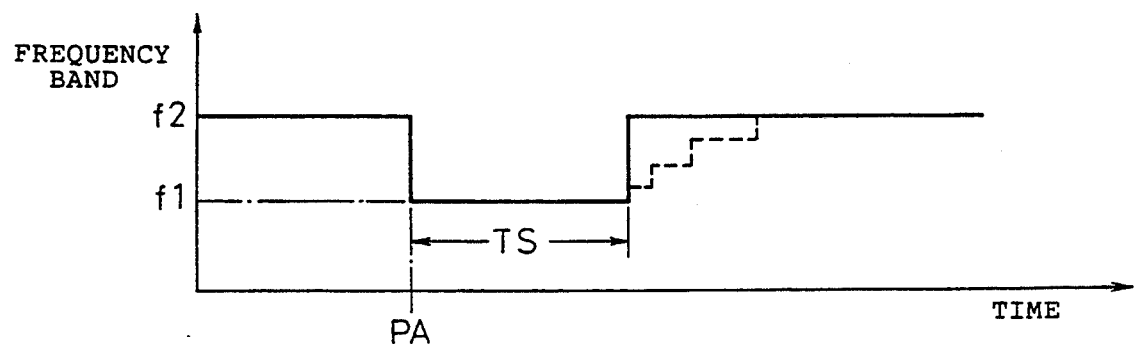
FIG. 9 is a diagram for explaining the operation based upon a fourth example of the present invention.

FIG. 9 is a diagram explaining the operation based on a fourth example of the present invention where the frequency band of the low-pass filter 14 in the phase-locked loop circuit 13 is switched upon detecting the point adjustment PA in the demultiplexer unit 11. The low-pass filter 14 has a usual frequency band f2. When the pointer adjustment PA is detected at the demultiplexer unit 11 and the detection signal "a" thereof is applied to the control unit 15, the processing unit 19 in the control unit 15 works so as to give a switch control signal "d" from the output unit 20 to the low-pass filter 14 to switch the low-pass filter 14 into a narrow frequency band f1 for a predetermined period of time TS only. Then, the low-pass filter 14 is switched to the narrow frequency band f1 for the period of time TS only. After the lapse of time TS, the frequency band is returned to the initial frequency band f2 at one time, or is returned in steps to the initial frequency band f2 as indicated by a dotted line, or is continuously returned to the initial frequency band f2.

Thus, the frequency band of the low-pass filter 14 is narrowed upon detecting the pointer adjustment PA making it possible to suppress the insertion of invalid data caused by pointer adjustment PA or suppress the low-frequency jitter caused by deletion.

Figure 10:
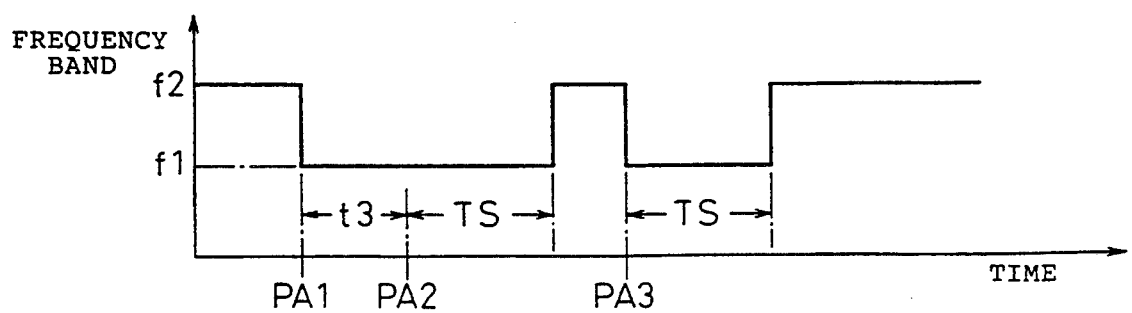
FIG. 10 is a diagram for explaining the operation based upon a fifth example of the present invention.

FIG. 10 is a diagram explaining the operation based upon a fifth example of the present invention in the case when the pointer adjustment PA has repetitively taken place. The frequency band of the low-pass filter 14 is switched from the usual frequency band f2 to the narrow frequency band f1 upon the detection of pointer adjustment PA1, and is switched again before the predetermined period of time TS lapses to the narrow frequency band f1 for the predetermined period of time TS from the moment of detection when the next pointer adjustment PA2 is detected, i.e., when TS>t3. After the lapse of time TS, the frequency band is returned to the initial frequency band f2.

When the next pointer adjustment PA3 is detected after the frequency band is returned to the initial frequency band f2, the control operation is carried out again to switch the frequency band to the frequency band f1 for the period of time TS only. That is, the control operation is carried out to switch the frequency band of the low-pass filter 14 from f2 into f1 based on the similar action to that of a retriggerable monostable multivibrator, which is triggered by the detection signal "a" of the pointer adjustment PA.

Figure 11:
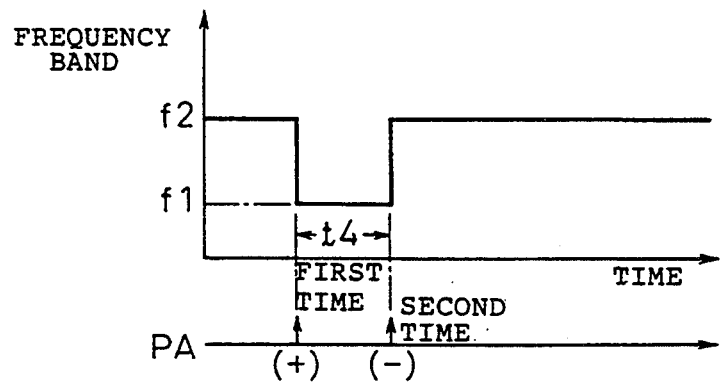
FIG. 11 is a diagram for explaining the operation based upon a sixth example of the present invention.

FIG. 11 is a diagram explaining the operation based on a sixth example of the present invention in the case when plus (+) and minus (−) pointer adjustments PA have taken place. When, for example, the pointer adjustment PA of the first time is a plus (+) one, the frequency band of the low-pass filter 14 is switched from the usual frequency band f2 to the narrow frequency band f1 upon the detection thereof and when the pointer adjustment PA of the second time within the predetermined period of time TS is a minus (−) one, the direction of the increasing or decreasing low-frequency jitter becomes opposite and the frequency band of the low-pass filter 14 is returned to the usual frequency band f2. When the minus (−) pointer adjustment PA is detected during the period when the frequency band of the low-frequency filter 14 is the usual frequency band f2, the control operation is carried out to switch the frequency band to the narrow frequency band f1.

Figure 12:
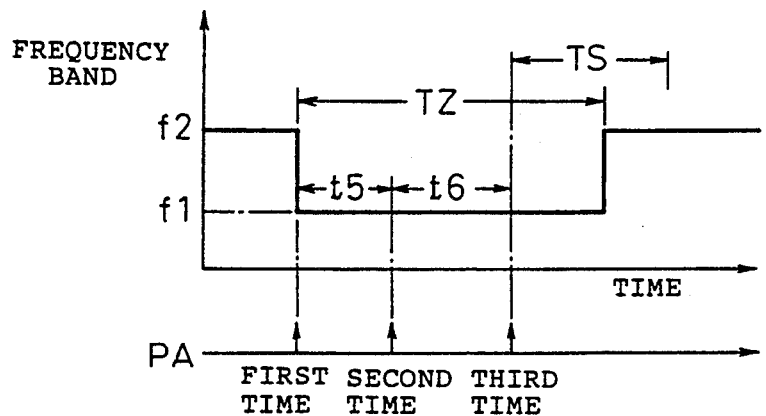
FIG. 12 is a diagram for explaining the operation based upon a seventh example of the present invention.

FIG. 12 is a diagram for explaining the operation based on a seventh example of the present invention, which is a modification from the fifth example (FIG. 10), and wherein when the usual frequency band f2 is switched to the narrow frequency band f1, a maximum value of time of the frequency band f1 is defined as TZ (>TS) and the frequency is forcibly returned to the usual frequency band f2 when a period of time longer than the above has passed. For instance, the usual frequency band f2 is switched to the narrow frequency band f1 upon detection of pointer adjustment PA of the first time. The condition of the narrow frequency band f1 continues upon the detection of pointer adjustment PA of the second time after a period of time t5 that is shorter than the predetermined period of time TS. Then, the condition of narrow frequency band f1 continues upon the detection of pointer adjustment PA of the third time after a period of time t6 that is shorter than the predetermined period of time TS. When the maximum setpoint time TZ lapses from when the pointer adjustment PA of the first time is detected, the frequency band is forcibly returned to the initial frequency band f2. This makes it possible to suppress the low-frequency jitter, to limit the time for staying in the narrow frequency band f1 and stabilize the operation of the phase-locked loop circuit 13.

Figure 13:
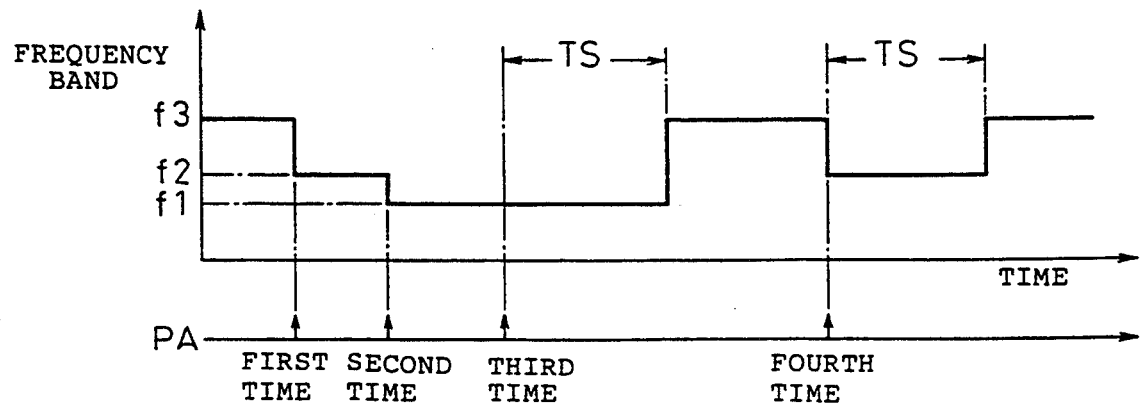
FIG. 13 is a diagram for explaining the operation based upon an eighth example of the present invention.

FIG. 13 is a diagram for explaining the operation based on an eighth example of the present invention in the case where the frequency band of the low-pass filter 14 is to be switched to f1, f2 and f3, upon every detection of the pointer adjustment PA. That is, the frequency band of the low-pass filter 14 that is the usual frequency band f3 is switched to a narrow frequency band f2 upon the detection of pointer adjustment PA of the first time, and is further switched to a narrower frequency band f1 upon the detection of pointer adjustment PA of the second time within the predetermined period of time TS. The frequency band has already been switched to the minimum frequency band f1 when the pointer adjustment PA of the third time is detected within the predetermined period of time TS, and this condition is maintained. Then, when the next pointer adjustment PA is not detected within the predetermined period of time, the control operation is carried out to return the frequency band to the initial frequency band f3.

When the pointer adjustment PA of the fourth time is detected under this condition, the frequency band f3 is switched to the frequency band f2, which is then returned back to the initial frequency band f3 when a next pointer adjustment PA is not detected within the predetermined period of time TS. In this example, the frequency band is returned to the initial frequency band f3 at one time. It is, however, also possible to return, in steps, the frequency band to the initial frequency band f3. After the maximum preset time TS has lapsed, furthermore, it is possible to forcibly return the frequency band to the initial frequency band f3 like in the seventh example (FIG. 12). It is further possible to carry out the switching control operation using frequency bands in numbers greater than f1, f2 and f3.

FIG. 14 is a diagram explaining the operation based on a ninth example of the present invention wherein in the usual operation mode, the frequency band of the low-pass filter 14 is switched maintaining a period T according to the first example shown in FIG. 6, and the usual frequency band f2 is switched to the narrow frequency band f1 for the predetermined period of time TS only upon the detection of the pointer adjustment and is returned to the usual operation mode after the lapse of the time TS. In the usual operation mode, the frequency band is switched according to the second and third examples (FIGS. 7A to 7C and 8), and the frequency band is switched upon the detection of pointer adjustment according to the fourth to eighth concrete examples (FIGS. 9 to 13) in combination with the above examples.

FIG. 15 is a diagram explaining the operation based on a tenth example of the present invention wherein in the usual operation mode, the frequency band of the low-pass filter 14 is switched maintaining the period T as in the aforementioned examples and when a line condition detection signal "c" produced by the switching of lines is applied to the control unit 15 at a moment indicated by L, the processing unit 19 in the control unit 15 forcibly returns the frequency band to the usual frequency band f2 and returns it to the usual operation mode again after the lapse of a time TL, which is longer than the time necessary for pulling in the phase synchronization. Therefore, even when the phase is not synchronized because of the switching of the lines, since the frequency band of the low-pass filter 14 in the phase-locked loop circuit 13 is switched to the broad frequency band f2, the phase synchronization can be pulled in within a relatively short period of time.

Figure 16:
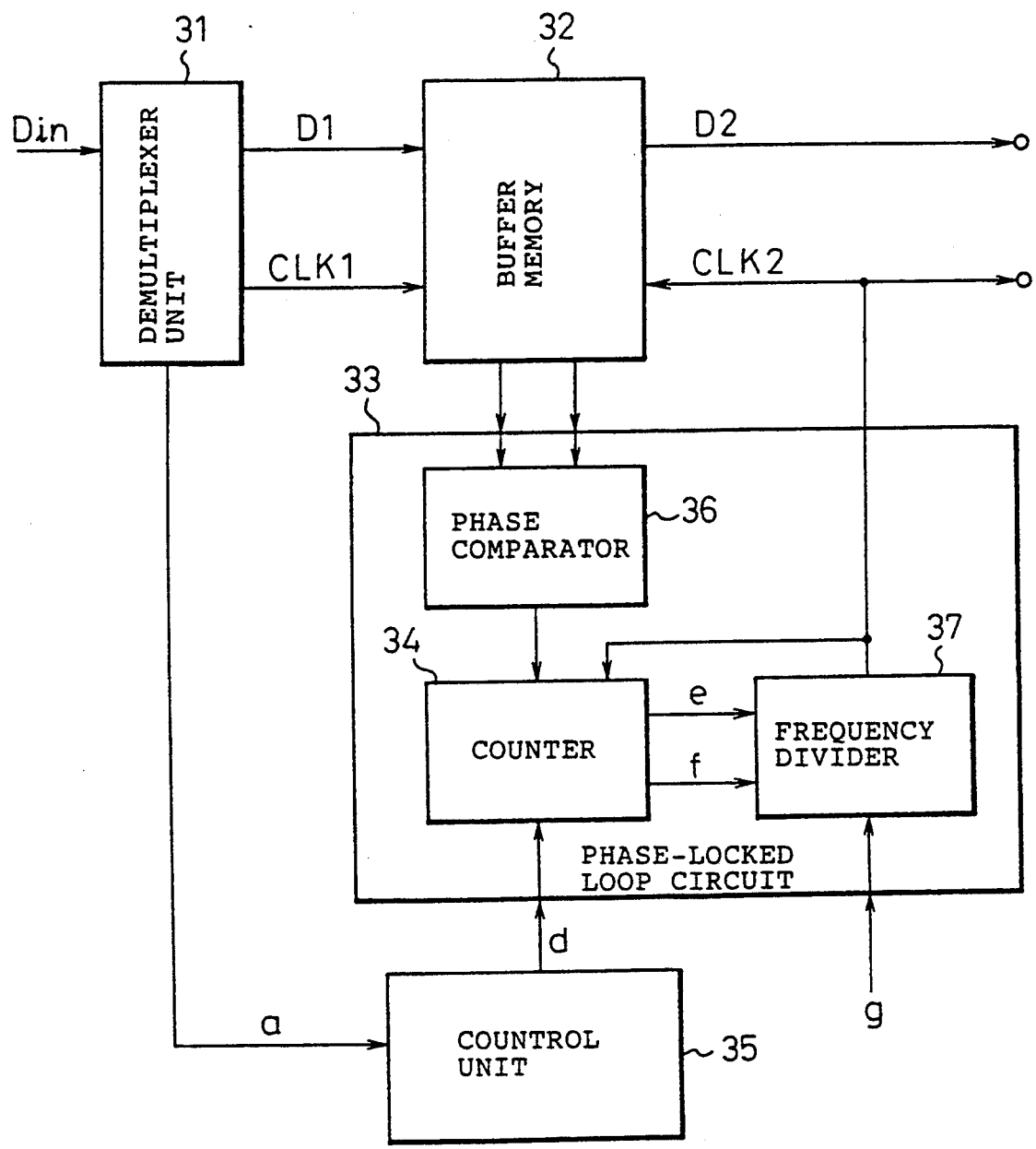
FIG. 16 is a block diagram illustrating the apparatus based upon a second embodiment of the present invention.

FIG. 16 is a block diagram illustrating a second embodiment of the present invention, wherein reference numeral 31 denotes a demultiplexer unit, 32 denotes a buffer memory, 33 denotes a phase-locked loop circuit, 34 denotes a counter that acts as a low-pass filter, 35 denotes a control unit, 36 denotes a phase comparator, and 37 denotes a frequency divider. This example deals with the case where a phase-locked loop circuit 33 of the digital controlled type is used, and wherein synchronous multiplexed signals Din are applied to the demultiplexer unit 31, asynchronous signals D1 are demultiplexed, write clock signals CLK 1 representing valid data are applied to the buffer memory 32, and valid data only are written into the buffer memory 32. The read data D2 by the read clock signals CLK 2 are transferred to the processing circuit in the next stage together with the read clock signals CLK 2.

The phase-locked loop circuit 33 comprises the phase comparator 36, the counter 34 and the frequency divider 37. The phase comparator 36 compares the phase of write clock signal CLK 1 with the phase of read clock signal CLK 2; the resultant comparison output signal serves as a control signal for a count up or count down of the counter 34, the upper limit value and the lower limit value of the counted content of the counter 34 is set by a control signal "d" from the control unit 35. When, for example, the upper limit value is attained, a control signal "e" is output to increase the frequency-dividing ratio of the frequency divider 37 by +1 and when the lower limit value is attained, a control signal "f" is output to decrease the frequency-dividing ratio of the frequency divider 37 by −1.

The frequency divider 37 divides the frequency of external high-speed clock signals "g" to form read clock signals CLK 2, and of which the frequency-dividing ratio is controlled depending upon a phase difference relative to the write clock signals CLK 1 to maintain synchronism in phase with the write clock signals CLK 1. Therefore, the setpoint value of the counter 34 for controlling the frequency-dividing ratio is controlled by the control unit 35 in order to switch the frequency band of the low-pass filter. In this case, the setpoint value can be switched continuously or in steps maintaining the period T, or the frequency band is switched to a narrow frequency band for the predetermined period of time TS only upon the detection of pointer adjustment.

For example, the TU-11 synchronous multiplexed signals recommended by CCITT contain a V3 byte that can be used for adjusting a difference in the clock frequency. When the DS1 signal is to be extracted from the TU-11 synchronous multiplexed signals, therefore, synchronous signals Din of 1.728 Mb/s are input to the demultiplexer unit 31. High-speed clock signals "g" of 49.408 Mb/s are input to the frequency divider 37 to divide the frequency by 32, and the read clock signals CLK 2 become 1.544 Mb/s. The frequency-dividing ratio of the frequency divider 37 is controlled so that the phase of read clock signals CLK 2 are in synchronism with the phase of write clock signals CLK 1 in which the invalid data portions are untoothed, and the setpoint value of the counted content of the counter 34 is controlled by the control unit 35 to switch the frequency band of the low-pass filter and suppress the low-frequency jitter as in the aforementioned examples.

Figure 17:
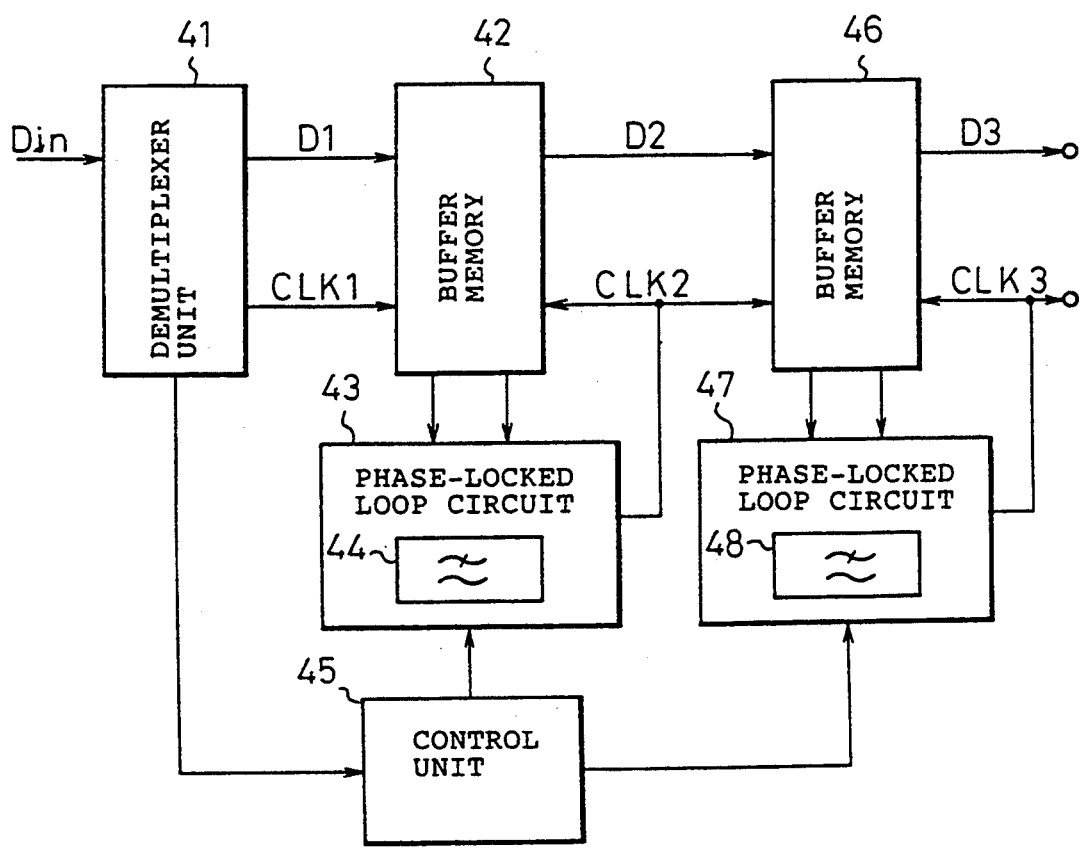
FIG. 17 is a block diagram illustrating the constitution based upon a third embodiment of the present invention.

FIG. 17 is a block diagram illustrating a third embodiment of the present invention, wherein reference numeral 41 denotes a demultiplexer unit, 42 and 46 denote buffer memories, 43 and 47 denote phase-locked loop circuits, 44 and 48 denote low-pass filters, 45 denotes a control unit, and wherein the buffer memories 42, 46 and the phase-locked loop circuits 43, 47 are constituted in two stages.

The read clock signal CLK 2 of which the phase is brought by the phase-locked loop circuit 43 of the first stage into synchronism with the write clock signal CLK 1 of the buffer memory 42 serves as a write clock signal to the buffer memory 46 of the second stage, and the read data D2 of the buffer memory 42 are written into the buffer memory 46. Further, the write clock signal and the read clock signal CLK 3, whose phase is synchronized by the phase-locked loop circuit 47 of the second stage, are applied to the buffer memory 46, and the read data D3 and the read clock signal CLK 3 are transferred to the processing circuit of the next stage.

The low-pass filters 44 and 48 in the phase-locked loop circuits 43 and 47 are controlled for their frequency bands by the control unit 45, which is provided in common for each of the stages. The control unit 45, however, may be provided for each of the stages and it is further possible to fix the frequency band of the low-pass filter of either the first stage or the second stage. For instance, when the frequency band of the low-pass filter 44 of the phase-locked loop circuit 43 of the first stage is to be switched to f1, f2 maintaining the period T, the frequency band of the low-pass filter 48 of phase-locked loop circuit 47 of the second stage is fixed, and the frequency band is selected so that the modulation frequency component in the phase-locked loop with the period T can be cut off by the low-pass filter 48 of the second stage. Then, the jitter is stably suppressed.

The frequency band of low-pass filters 44 and 48 of the first stage and second stage can be switched in a complementary manner. That is, when the frequency band of the low-pass filter 44 of the first stage is f1, the frequency band of the low-pass filter of the second stage is set to be f2 and when the frequency band of the low-pass filter 44 of the first stage is f2, the frequency band of the low-pass filter 48 of the second stage is set to f1. Similarly, even when the frequency band of the low-pass filter is controlled upon detection of the point adjustment, the first stage and the second stage can be switched in a complementar manner.

The present invention is not limited to the aforementioned examples but encompasses the constitution of a combination of these examples.

Finally, the control unit 15 shown in FIG. 4 and the control unit 35 shown in FIG. 16 will be described in detail.

Figure 18:
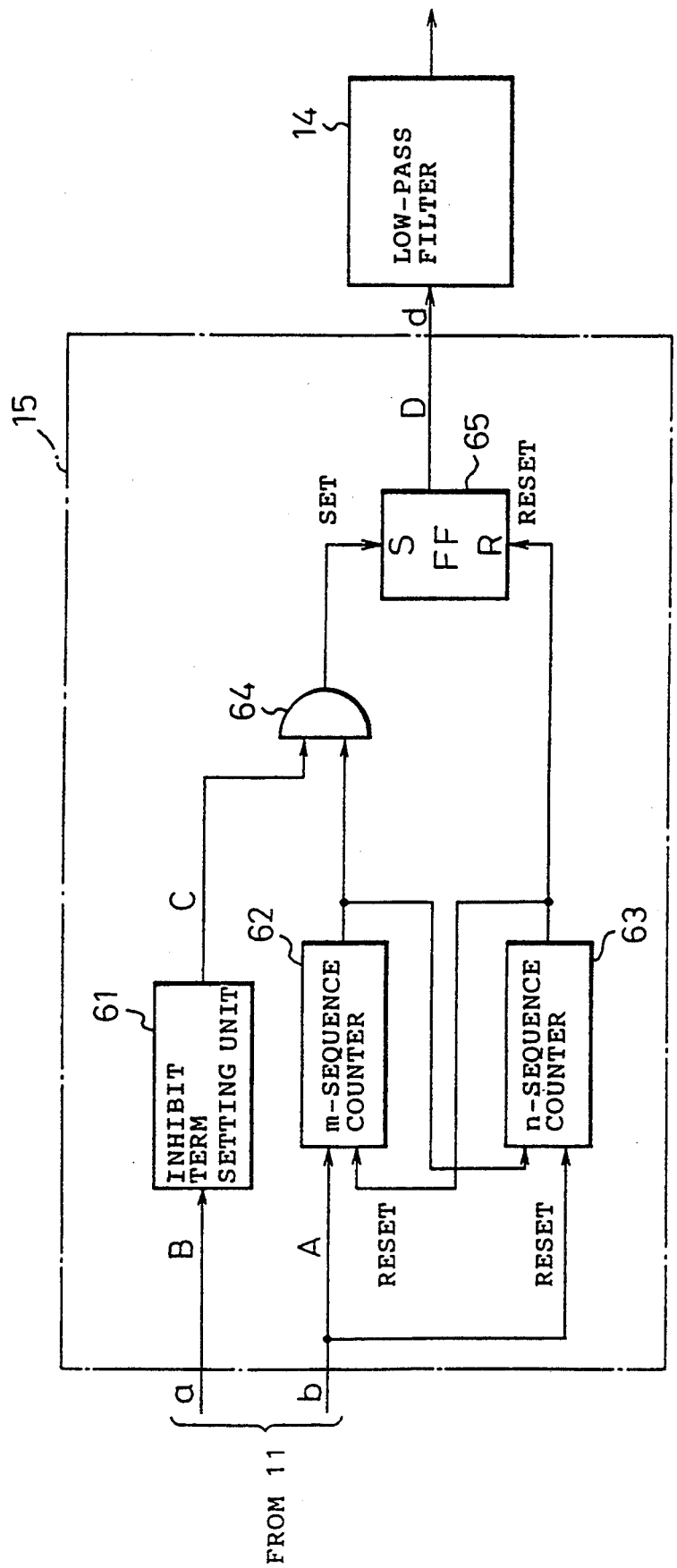
FIG. 18 is a diagram illustrating the control unit of FIG. 4 in detail.

FIG. 18 is a diagram illustrating in detail the control unit of FIG. 4. A block indicated by a dot-dash chain line is the control unit 15 of FIG. 4, and signals "a, b and d" correspond to signals "a, b and d" of FIG. 4. The operation of the circuit of FIG. 18 will be described with reference to FIGS. 19A to 19D.

FIGS. 19A to 19D are diagrams of signal waveforms appearing at major portions of the circuit of FIG. 18, i.e., appearing at portions A to D of FIG. 18.

The synchronization frame detection signal "b" of FIG. 4 is applied commonly and as a frame pulse FP to an m-sequence counter 62 and an n-sequence counter 63 that counts up the FP inputs and outputs a carry, respectively, when a predetermined number of frame pulses are counted. Here, m and n (which are integers greater than 2) are determined so that the m-sequence counter 62 outputs the carry after the time t2 (wide frequency band f2) of FIG. 6 and the n-sequence counter 63 outputs the carry after the time t1 (narrow frequency band f1) of FIG. 6.

Figure 19:
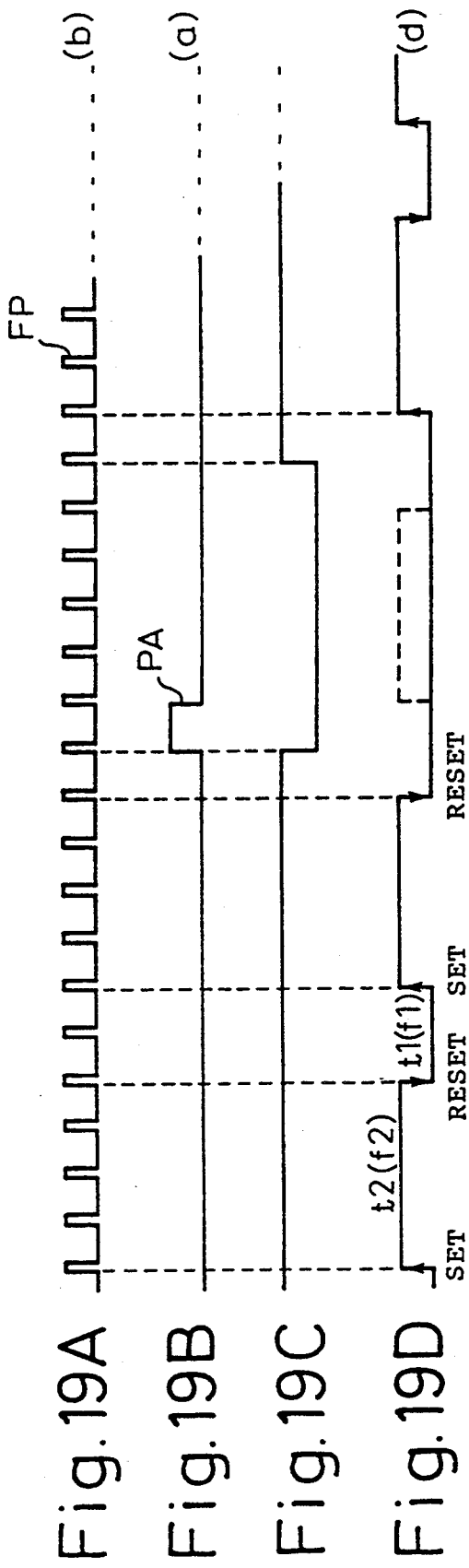
FIGS. 19A to 19D are diagrams of signal waveforms appearing at major portions of the circuit of FIG. 18.

The carry outputs of the m-sequence counter 62 and n-sequence counter 63 are applied to the set input (S) and the reset input (R) of an RS flip-flop (FF) 65, and a pulse shown in FIG. 19D is output from the flip-flop 65. The timings of the rising and falling of the output pulse (FIG. 19D) are determined by the output timings of carries from the m-sequence and n-sequence counters 62 and 63.

When the point adjustment PA is detected (FIG. 19B), the detection signal PA (signal "a" in FIG. 4) is applied to an inhibit term setting unit 61 that consists, for example, of a monomultivibrator. The setting unit 61 inhibits the carry from being applied to the set input (S) of the flip-flop 65 from the m-sequence counter 62 for a predetermined period of time from the generation of detection signal PA. For this purpose, provision is made of an AND gate 64, and the setting unit 61 outputs a signal "L" (low) (FIG. 19B) during the inhibit term to keep the AND gate 64 closed. With the AND gate 64 closed, the flip-flop output that should have been generated does not appear (pulse indicated by a dotted line in FIG. 19D) if there is no signal PA.

Thus, the switch control signal "d" (FIG. 19D) is formed by the RS flip-flop 65 and is given to the low-pass filter 14.

Figure 20:
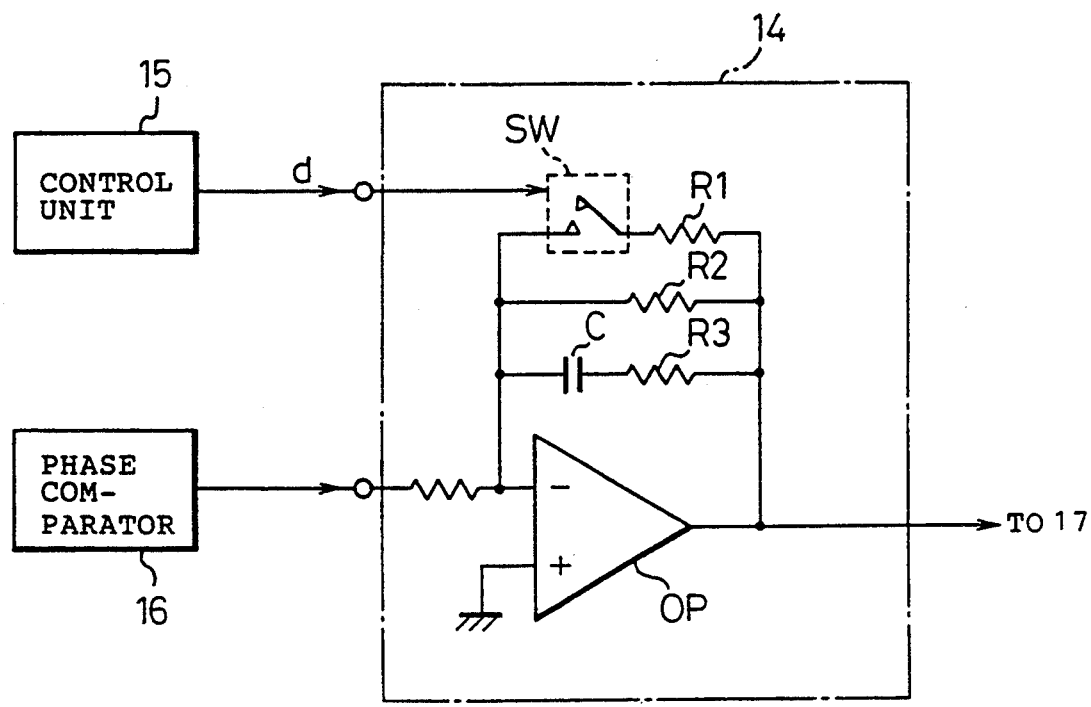
FIG. 20 is a diagram showing in detail the low-pass filter (FIG. 4) that is controlled by the control unit of FIG. 18.

FIG. 20 is a diagram illustrating in detail the low-pass filter (FIG. 4) controlled by the control unit of FIG. 18. The low-pass filter 14 in this example is comprised of an analog filter made up of an operational amplifier OP and CR circuits (C, R1, R2, R3) comprising an integration circuit. The above-mentioned wide frequency band (f2) and the narrow frequency band (f1) are realized by switching the CR time constant and, for this purpose, a switch SW is connected in series with the resistance R1. The switch SW is turned off when the switch control signal "d" (FIG. 19D) from the control unit 15 is "H" (high) and is turned on when the above signal is "L". Therefore, the analog filter 14 operates on the wide frequency band (f2) when the switch SW is turned off (d="H") and, conversely, operates on the narrow frequency band (f1) when the switch SW is turned on (d="L").

Figure 21:
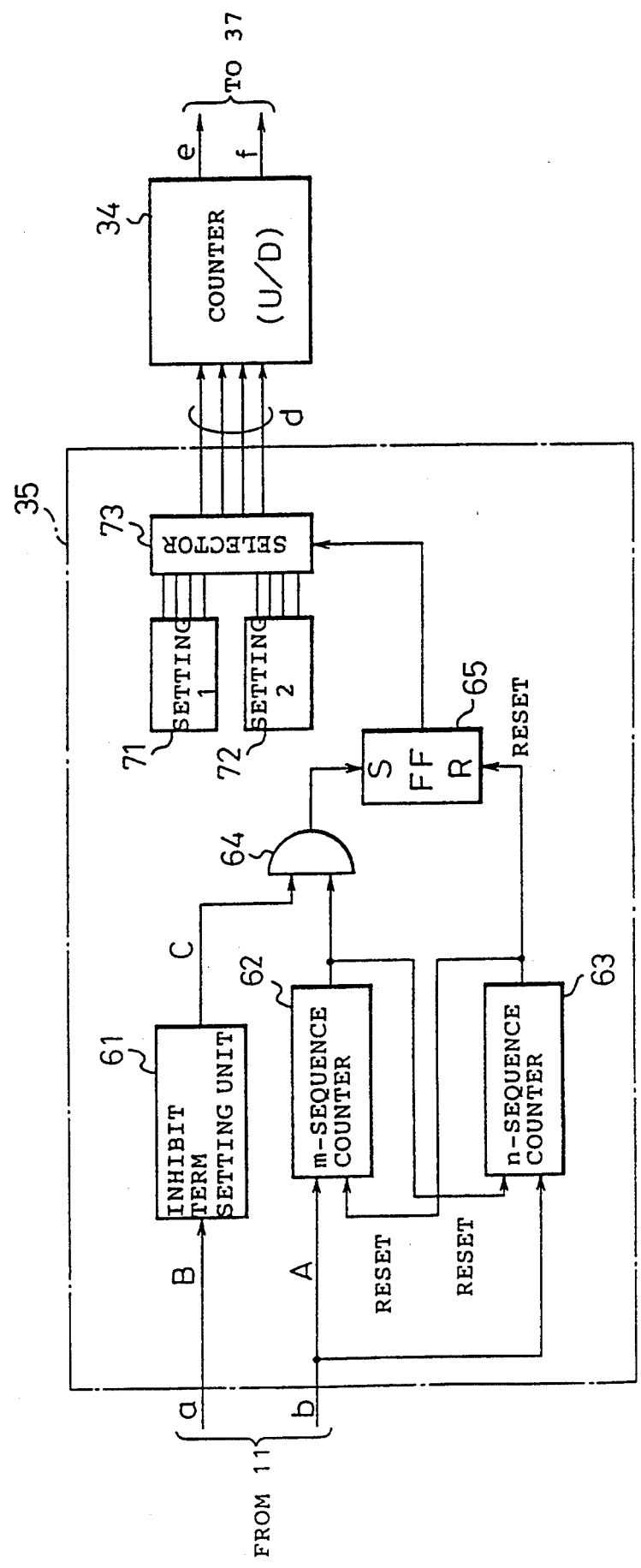
FIG. 21 is a diagram showing in detail the control unit of FIG. 16.

FIG. 21 is a diagram illustrating in detail the control unit of FIG. 16. In the circuit of FIG. 16, a counter is used as the above-mentioned low-pass filter (14). Concretely speaking, it is an up/down counter (U/D). The DPLL (digital phase-locked loop) filter for the low-pass filter utilizing the up/down counter may, for example, be an IC, Model SN54LS297 or SN74LS297 produced by Texas Instruments Co.. In this case, a bit must be set to set the so-called K-counter (according to the description of the catalog of the above IC) in order to switch the broad frequency band and the narrow frequency band. Then, the control unit shown in FIG. 18 must comprise the apparatus as shown in FIG. 21. That is, two kinds of counter setpoint values for a wide frequency band and a narrow frequency band are set for the up/down counter, and either one of them is preset to the up/down counter. For this purpose, provision is made of a register 71 (for narrow frequency band) and a register 72 (wide frequency band). The value is selected by a selector 73 and is given to the up/down counter. The selector 73 selects the output of the register 71 or 72 depending upon the output "H" or "L" (FIG. 19D) of the RS flip-flop 65 described with reference to FIG. 18.

According to the circuit for extracting asynchronous signals multiplexed in the synchronization frame of the present invention as described above, valid data only are written by the write clock signals applied to the buffer memory 2 from the demultiplexer unit 1, valid data are read out by the read clock signals, read clock signals phase locked to the write clock signals are output by the phase-locked loop circuit 3, and the frequency band of the low-pass filter 4 in the phase-locked loop circuit 3 is switched by the control unit 5 periodically or depending on a detection signal of invalid data by the pointer adjustment. When the frequency band is periodically switched, the time for pulling in the phase synchronization is maintained at a desired value and the frequency band of the low-pass filter 4 is equivallently narrowed, making it possible to suppress the low-frequency jitter caused by pointer adjustment.

Further, the frequency band of the low-pass filter 4 is switched in steps or continuously to stably operate the phase-locked loop circuit 3 and suppress the low-frequency jitter.

Furthermore, the frequency band of the low-pass filter 4 is gradually narrowed every time the pointer adjustment is detected within a predetermined period of time TS, in order to reliably suppress an increase in low-frequency jitter.

By constituting the phase-locked loop circuit 3 in a digital controlled type, it is possible to realize the functions using digital logic circuits such as digital signal processors to stably carry out the operation. Furthermore, the setpoint value of the counter 34 that acts as a low-pass filter can be easily controlled digitally by the control unit 35.

By employing the two-stage constitution, furthermore, the modulation frequency components produced in the phase-locked loop circuit of the first stage caused by switching the frequency band of the low-pass filter maintaining the period T, can be removed by the low-pass filter of the phase-locked loop circuit of the second stage. Therefore, the low-frequency jitter is reliably suppressed.

Moreover, the frequency bands of low-pass filters of the first stage and the second stage are switched in a complementary manner to maintain the pull-in time of the phase synchronization at a desired value to suppress the low-frequency jitter.

Compared with the conventional circuit apparatuses (1) to (4) as described above, the present invention makes it possible to easily realize the circuit and increase the effect for suppressing low-frequency jitter caused by pointer adjustment.

INDUSTRIAL APPLICABILITY

The asynchronous signal extracting circuit proposed here can be applied as a part of a receiving circuit in a communication system of a synchronous digital hierarchical structure.

We claim:

1. An asynchronous signal extracting circuit comprising:
a demultiplexer which demultiplexes asynchronous signals including valid data, detects a pointer adjustment, generates a pointer adjustment detection signal upon detection of the pointer adjustment, and extracts clock signals in synchronism with the demultiplexing of said valid data;
a buffer memory that writes said demultiplexed valid data using said clock signals extracted from the asynchronous signals and transmitted from said demultiplexer to said buffer memory as write clock signals;
a phase-locked loop circuit which forms read clock signals for said buffer memory; and
a control unit which switches a frequency band of a low-pass filter in the phase-locked loop circuit periodically or in response to said pointer adjustment detection signal.

2. An asynchronous signal extracting circuit according to claim 1, wherein said control unit continuously or in steps switches the frequency band of said low-pass filter within a predetermined period.

3. An asynchronous signal extracting circuit according to claim 1, wherein said control unit gradually narrows the frequency band of said low-pass filter every time said pointer adjustment detection signal is obtained within a predetermined period of time in said demultiplexer, and returns the frequency band of said low-pass filter to the initial frequency band gradually or at one time when said pointer adjustment detection signal is not obtained within the predetermined period of time.

4. An asynchronous signal extracting circuit according to claim 1, wherein said phase-locked loop circuit has a counter which counts a phase difference between the write clock signal and the read clock signal of said buffer memory, and a frequency divider of which the frequency-dividing ratio is controlled when the counted content of said counter has reached a setpoint value and produces a frequency-divided output signal as said read clock signal, and wherein said control unit controls said low pass filter.

5. An asynchronous signal extracting circuit according to claim 1, wherein said buffer memory and said phase-locked loop circuit further comprise two stages, clock signals being outputted from the phase-locked loop circuit of the first stage as read clock signals to the buffer memory of the first stage and as write clock signals to the buffer memory of the second stage, the read clock signals for the buffer memory of the second stage are formed by the phase-locked loop circuit of the second stage, and wherein said control unit controls the frequency band of low-pass filter in the phase-locked loop circuit of at least one of the first and second stage.

6. An asynchronous signal extracting circuit according to claim 5, wherein said control unit complementarily switches the frequency bands of low-pass filters in phase-locked loop circuit of said first stage and said second stage.

* * * * *